(12) United States Patent
Park

(10) Patent No.: US 7,213,979 B2
(45) Date of Patent: May 8, 2007

(54) LATCHING APPARATUS FOR PLUGGABLE OPTICAL TRANSCEIVER MODULE

(75) Inventor: Kyung-Wan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/108,979

(22) Filed: Apr. 19, 2005

(65) Prior Publication Data

US 2006/0093285 A1 May 4, 2006

(30) Foreign Application Priority Data

Nov. 3, 2004 (KR) .................... 10-2004-0089034

(51) Int. Cl.
   *G02B 6/36* (2006.01)
   *G02B 6/00* (2006.01)
(52) U.S. Cl. ............................ 385/92; 385/88; 385/136
(58) Field of Classification Search .................... None
   See application file for complete search history.

(56) References Cited

U.S. PATENT DOCUMENTS 6,464,403 B1 * 10/2002 Koch et al. .................. 385/53
6,533,603 B1 * 3/2003 Togami ...................... 439/372
6,916,123 B2 * 7/2005 Kruger et al. ................ 385/92
2004/0161958 A1 * 8/2004 Togami et al. .............. 439/160
2005/0003696 A1 * 1/2005 Shirk et al. .................. 439/352

* cited by examiner

*Primary Examiner*—Frank G. Font
*Assistant Examiner*—Eric Wong
(74) *Attorney, Agent, or Firm*—Cha & Reiter, L.L.C.

(57) ABSTRACT

Disclosed is a latching apparatus for a pluggable optical transceiver module, which is configured to enable the pluggable optical transceiver module to be plugged or unplugged by pulling the pluggable optical transceiver module. The latching apparatus of the pluggable optical transceiver module connected to an optical connector and electrically connected to a cage assembly includes: a module housing, which is extended in a length direction and used to latch and fix the pluggable optical transceiver module to the cage assembly; and a clip-type latch, which is assembled through the outer circumference of the module housing and used to release the module housing from the cage assembly by horizontally and vertically moving with respect to the length direction in response to pulling of the clip-type latch when the module housing is unplugged from the cage assembly.

20 Claims, 14 Drawing Sheets

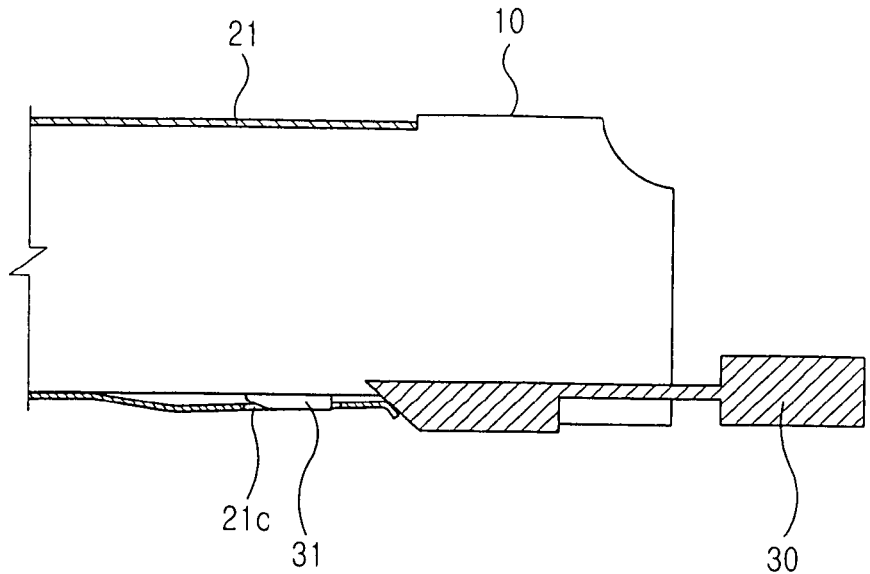
FIG.3
[PRIOR ART]
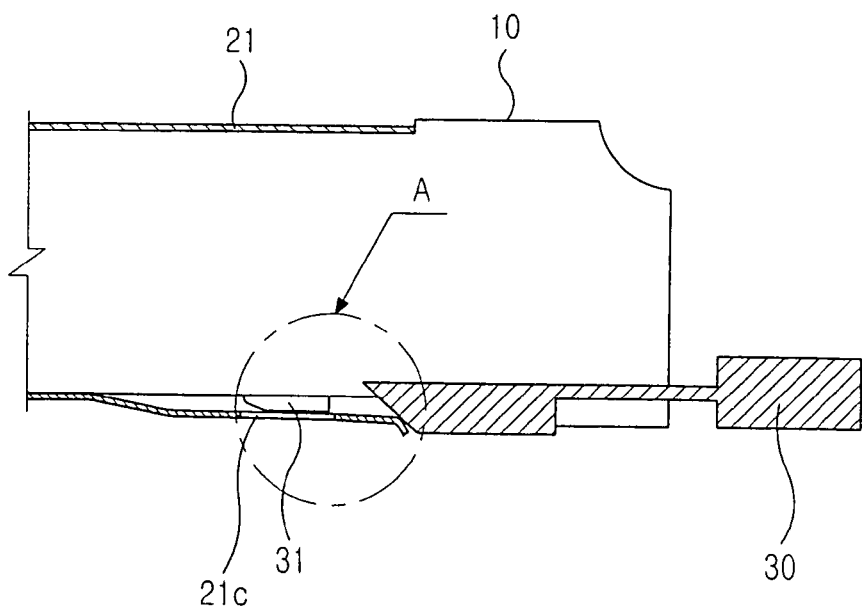
FIG.4 [PRIOR ART]

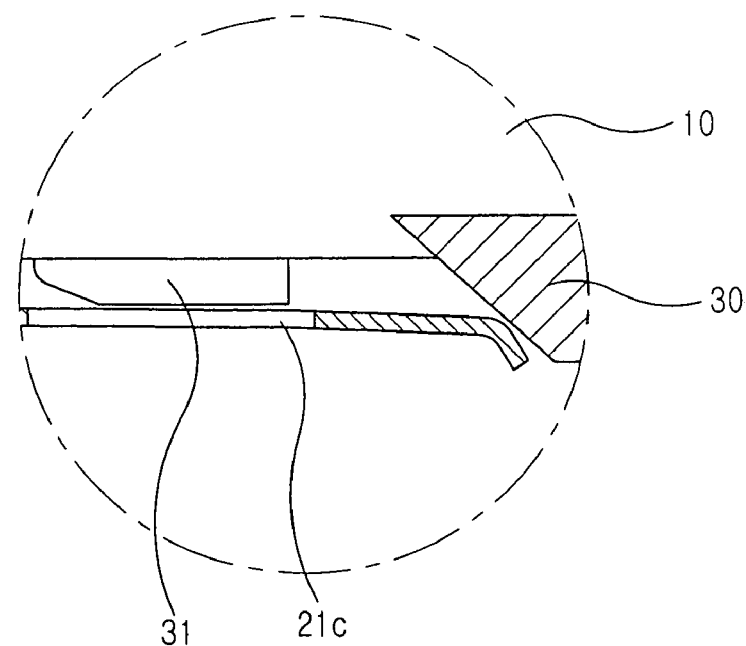
FIG.5 [PRIOR ART]
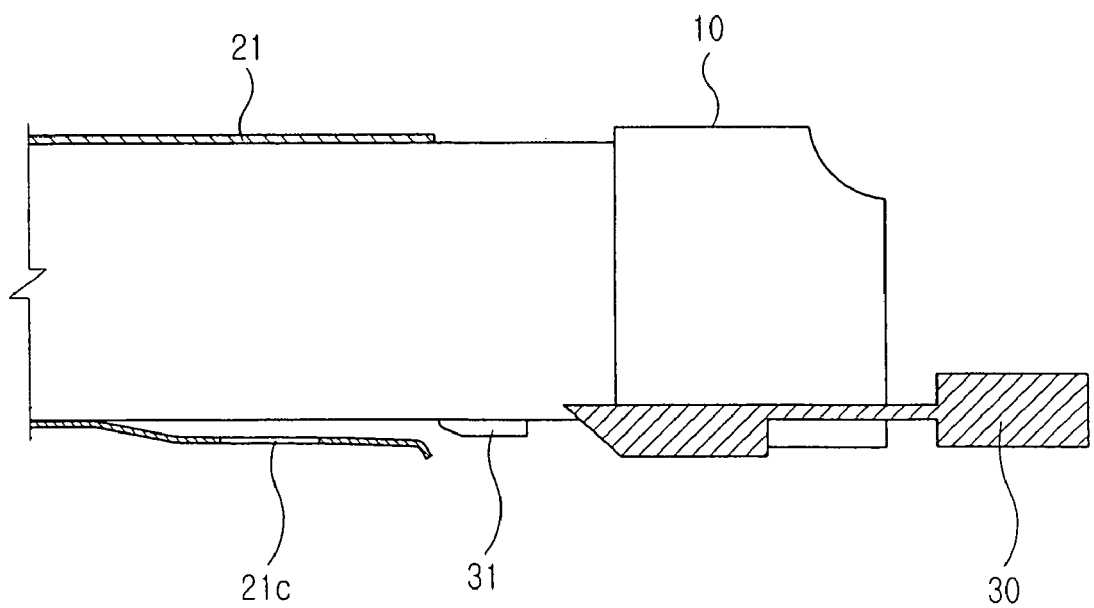
FIG.6 [PRIOR ART]

LATCHING APPARATUS FOR PLUGGABLE OPTICAL TRANSCEIVER MODULE

CLAIM OF PRIORITY

This application claims priority under 35 U.S.C. § 119(e) to that patent application entitled "Latching Apparatus for Pluggable Optical Transceiver Module," filed in the Korean Intellectual Property Office on Nov. 3, 2004 and assigned Serial No. 2004-89034, the contents of which are incorporated herein by reference.

BACKGROUND OF THE INVENTION

1. Field of the Invention

The present invention relates optical communications systems and to a latching apparatus for a pluggable optical transceiver module.

2. Description of the Related Art

With the development of information and communication technologies, optical communication systems by which bulk information can be transmitted at a high data rate with a few communication lines have been popularly used to transmit more information using limited lines in various communication networks and intelligent networks.

In the optical communication systems, optical communication devices, such as optical communication switches, which have been developed on the basis of various standards, and optical transceiver modules such as a gigabit interface converter (GBIC), are used to convert input optical signals to electrical signals and electrical signals to output optical signals.

Each optical transceiver module includes an optical connecting device containing a light source, a light source detector, an optical transmission circuit, and an optical reception circuit.

The optical transceiver modules are produced on the basis of various standards in which module specifications are propagated to miniaturize optical communication electronic devices.

For example, the 10 Gigabit Small Form Factor Pluggable (SFP) Multi-Source Agreement (MSA) Revision 3.1, is a standard propagated for a small form factor optical transceiver module.

FIGS. 1 through 6 illustrate structural elements of an SFP module 10. Functions of main elements will now be schematically described.

Referring to FIGS. 1 and 2, the SFP module 10 is a pluggable optical transceiver module including electrical connector 15, which is an electrical contact point between a host board 20 and the SFP module 10. Cage assembly 21 is a housing assembled to fix the SFP module 10 including the electrical connector 15 thereto. Heat sink 22 radiates heat generated by the SFP module 10 to the outside environment, and clip 23 fixes the heat sink 22 to the cage assembly 21.

The SFP module 10 and the cage assembly 21 will now be described with reference to FIGS. 1 through 6.

Referring to FIGS. 1 through 3, the SFP module 10 includes insertion holes 13 for inserting an optical connector 40 (see FIGS. 12 and 16) thereinto, a latch 30, and a locking arm 31. When the SFP module 10 is plugged in or unplugged from the cage assembly 21, the locking arm 31 (FIG. 2) is locked in or unlocked from a locking catch 21c (FIG. 3) included in the cage assembly 21 by pushing the latch 30.

Referring to FIGS. 4 and 5, when it is intended to unplug the SFP module 10 from the cage assembly 21, by pushing the latch 30 an end of the latch 30 guides and lifts up an end of the locking catch 21c, and then the SFP module 10 is pulled when the locking arm 31 is unlocked from the locking catch 21c.

Thus, the SFP module 10 is unplugged from the cage assembly 21 as shown in FIG. 6.

When it is intended to plug the SFP module 10 in the cage assembly 21, which is performed by pushing the latch 30 into the cage assembly 21, the locking arm 31 is guided by the end of the locking catch 21c and bends and lifts up the end of the locking catch 21c. The SFP module 10 is then fixed to the cage assembly 21 by the insertion of locking arm 31 into the locking catch 21c.

The pluggable optical transceiver module 10 is unplugged from the cage assembly 21 by lifting up the locking catch 21c by pushing the latch 30 and pulling the pluggable optical transceiver module 10 while maintaining a state of pushing the latch 30.

As described above, since a conventional pluggable optical transceiver module is unplugged from a cage assembly by pulling the conventional pluggable optical transceiver module while maintaining a state of pushing on a latch, it is difficult for the conventional pluggable optical transceiver module to be unplugged from the cage assembly. Therefore, whenever the conventional pluggable optical transceiver module is unplugged from the cage assembly for test or maintenance activities, user inconvenience is caused by repeating the process described above.

Hence, there is a need in the industry for a means for unplugging an optical module without the inconvenience caused by having to push on the module to unattached it from the locking mechanism.

SUMMARY OF THE INVENTION

One aspect of the present invention is to substantially solve at least the above problems and/or disadvantages and to provide at least the advantages below. Accordingly, an object of the present invention is to provide a latching apparatus for a pluggable optical transceiver module, which is configured to enable the pluggable optical transceiver module to be plugged or unplugged by pulling the pluggable optical transceiver module.

Another aspect of the present invention is to provide a latching apparatus for a pluggable optical transceiver module, which is configured to enable the pluggable optical transceiver module to be plugged or unplugged in a state in which an optical connector is connected to the pluggable optical transceiver module by forming a clip-type latch moving in a horizontal/vertical direction in response to pulling of the pluggable optical transceiver module.

According to yet another aspect of the present invention, a latching apparatus of a pluggable optical transceiver module connected to an optical connector and electrically connected to a cage assembly includes: a module housing, which is extended in a length direction and used to latch and fix the pluggable optical transceiver module to the cage assembly; and a clip-type latch, which is assembled through the outer circumference of the module housing and used to release the module housing from the cage assembly by horizontally/vertically moving based on the length direction in response to pulling of the clip-type latch when the module housing is unplugged from the cage assembly.

BRIEF DESCRIPTION OF THE DRAWINGS

The above features and advantages of the present invention will become more apparent from the following detailed description when taken in conjunction with the accompanying drawings in which:

FIG. 3 is a side sectional view illustrating a state in which the conventional pluggable optical transceiver module is plugged in a cage assembly;

FIG. 4 is a side sectional view illustrating a state before the conventional pluggable optical transceiver module is unplugged from the cage assembly;

FIG. 5 is a magnified side sectional view of Section A of FIG. 4;

FIG. 6 is a side sectional view illustrating a state after the conventional pluggable optical transceiver module is unplugged from the cage assembly;

DETAILED DESCRIPTION

An embodiment of the present invention is described herein with reference to the accompanying drawings. For the purposes of clarity and simplicity, well-known functions or constructions are not described in detail as they would obscure the invention in unnecessary detail.

Figure 1:
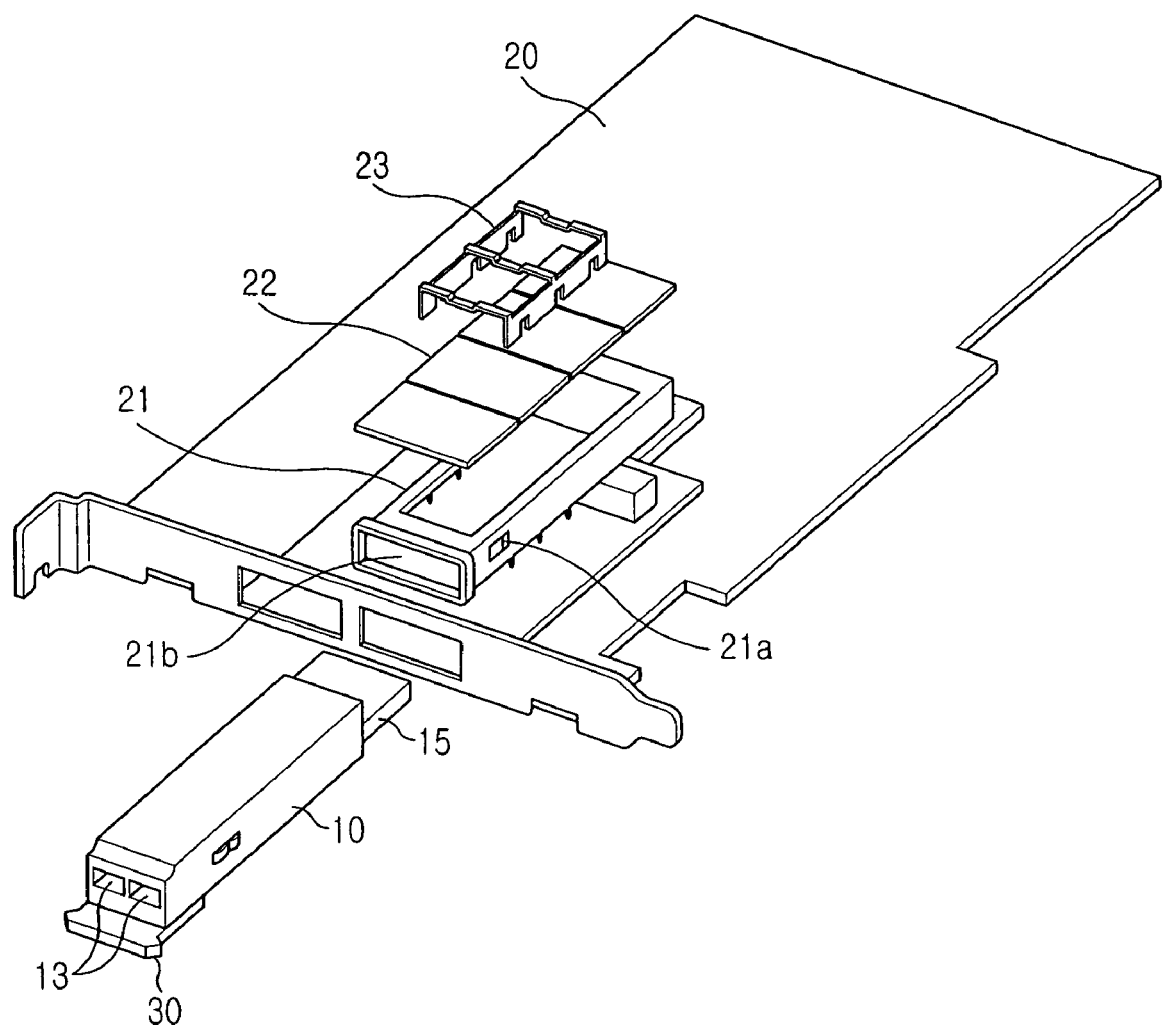
FIG. 1 is a disassembled perspective view illustrating a configuration of a conventional pluggable optical transceiver module.
Figure 2:
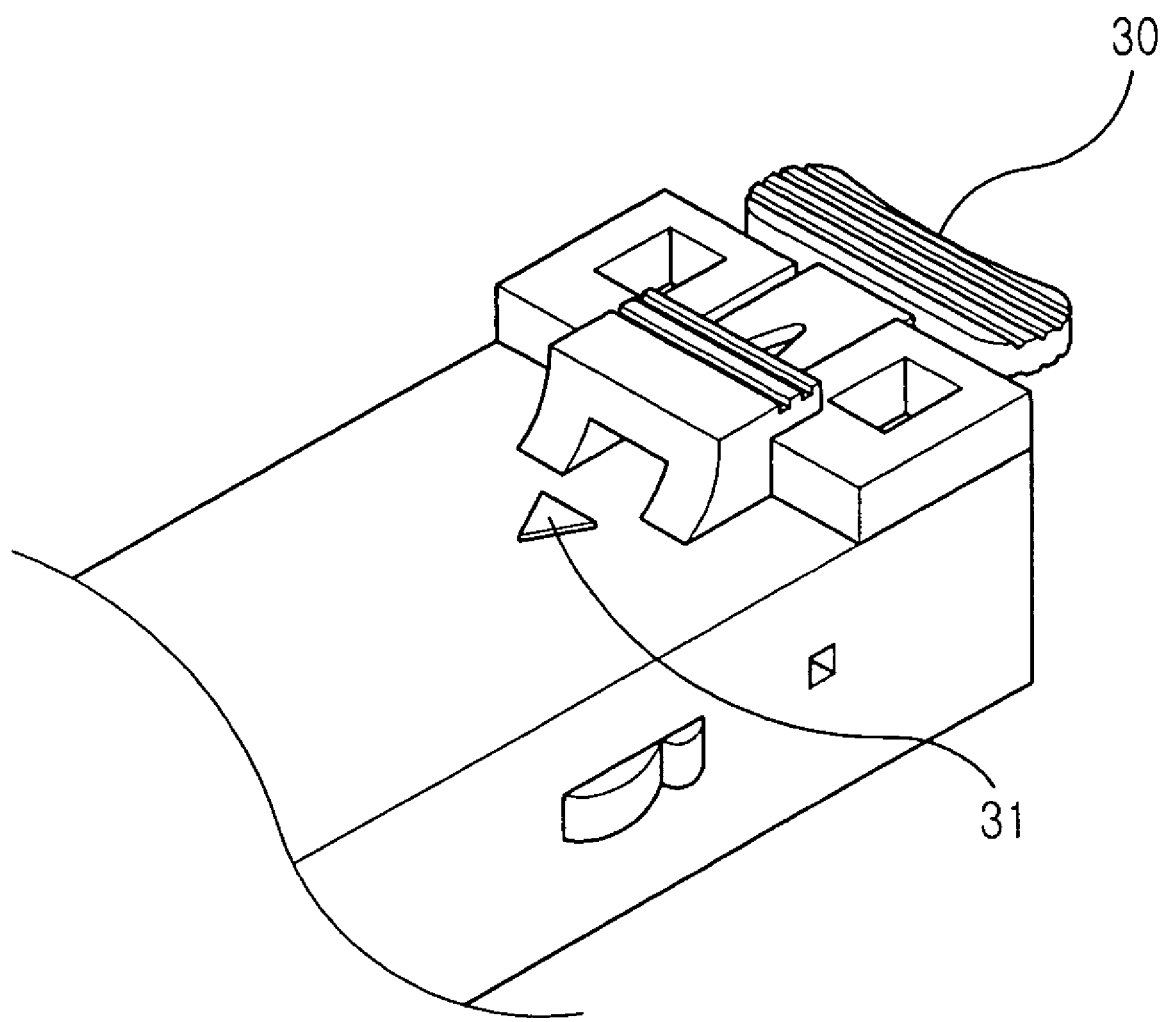
FIG. 2 is a perspective view of a module housing of the conventional pluggable optical transceiver module.
Figure 7:
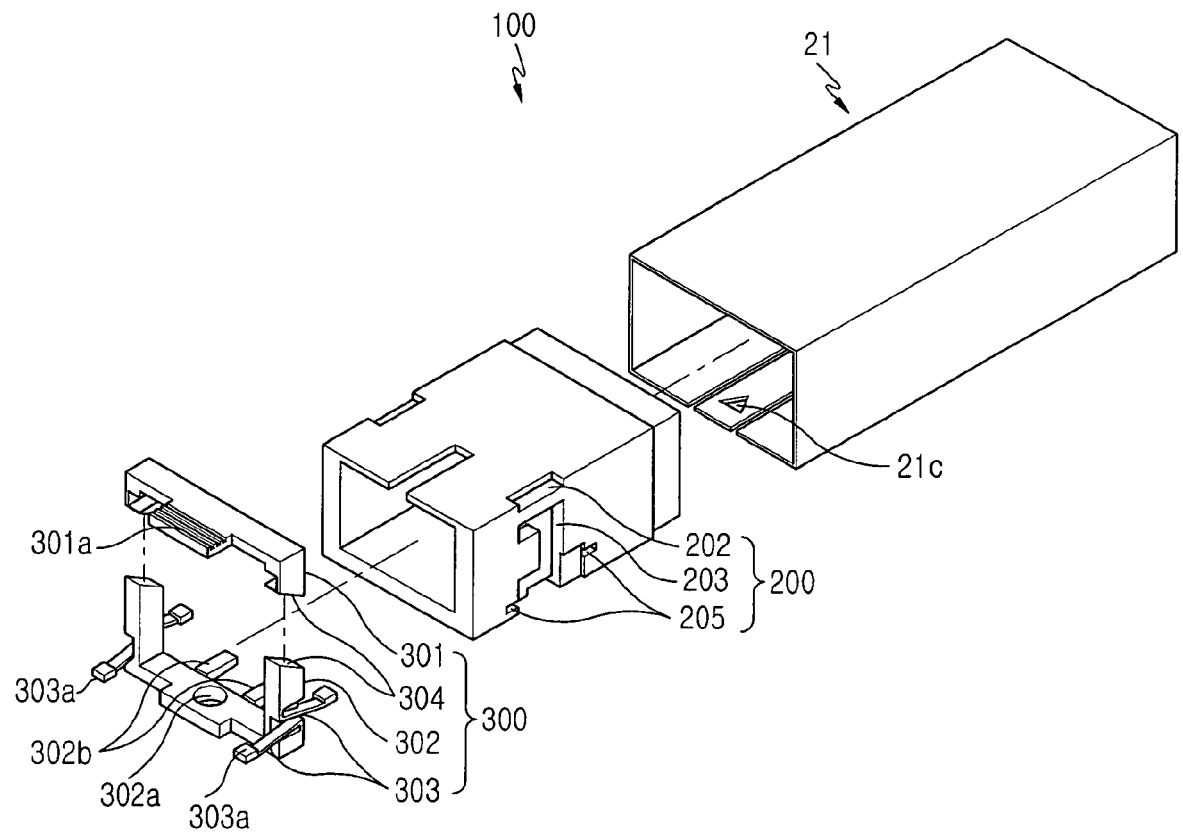
FIG. 7 is a disassembled perspective view illustrating a configuration of a latching apparatus of a pluggable optical transceiver module according to a preferred embodiment of the present invention.
Figure 8:
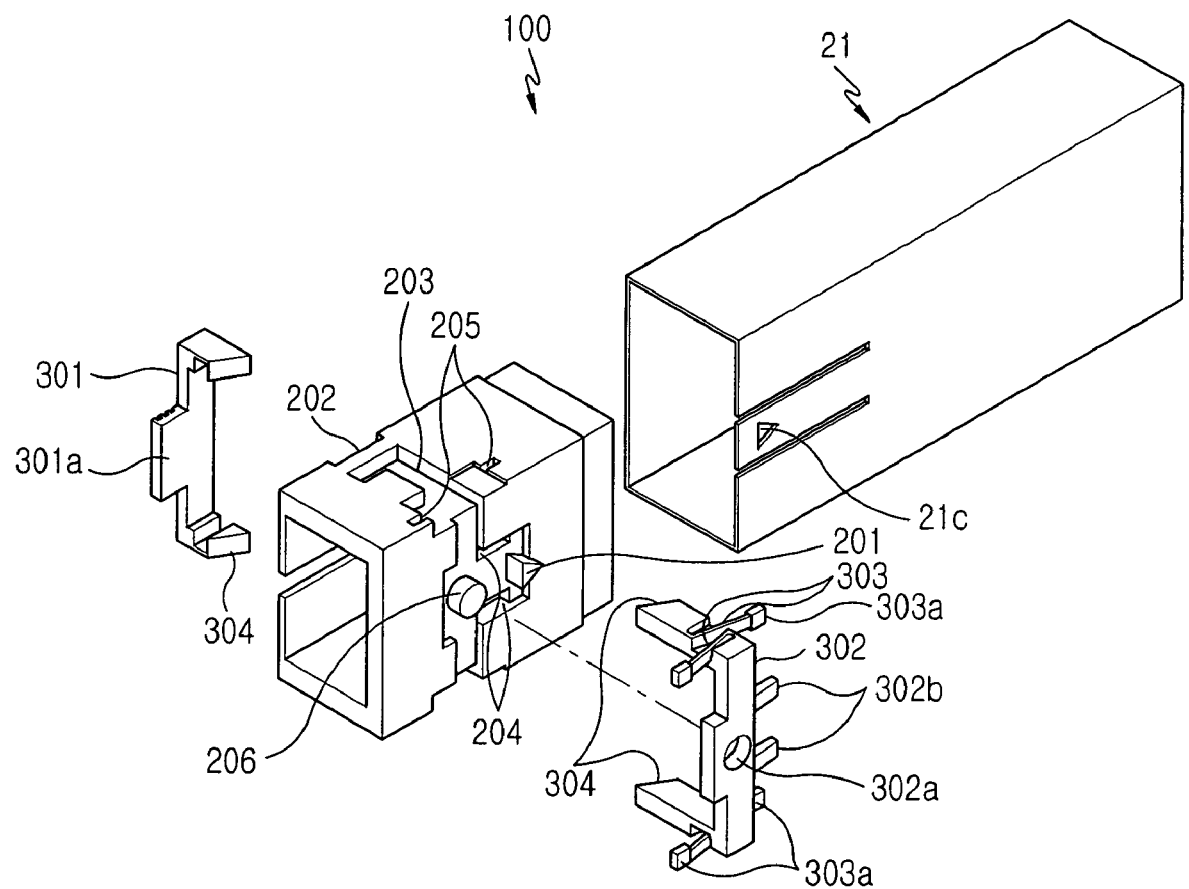
FIG. 8 is a disassembled perspective view illustrating the rear part of the latching apparatus of the pluggable optical transceiver module according to the preferred embodiment of the present invention.
Figure 9:
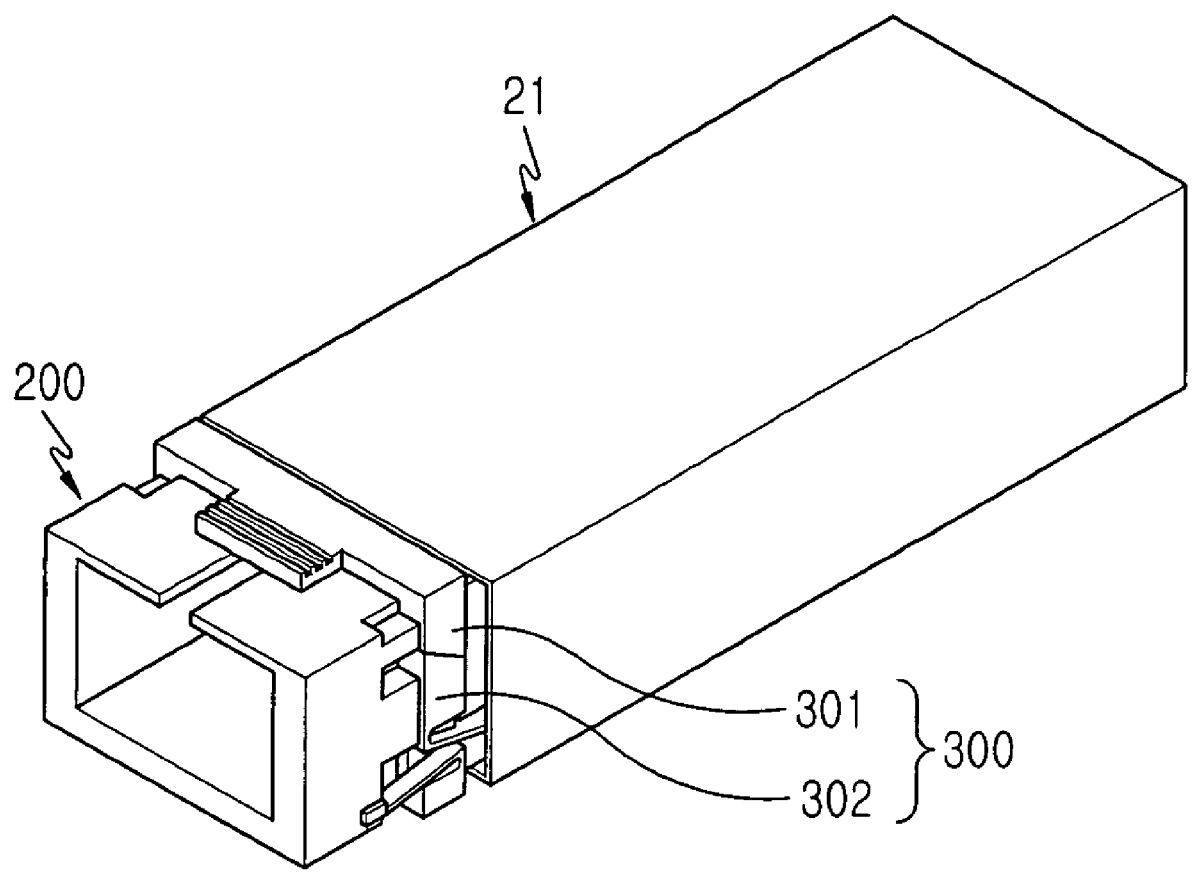
FIG. 9 is a perspective view illustrating a state in which the latching apparatus of the pluggable optical transceiver module according to the preferred embodiment of the present invention is assembled with a module housing.

As shown in FIGS. 7 through 9, a latching apparatus 100 of a pluggable optical transceiver module includes a module housing 200 and a clip-type latch 300. The module housing 200 is formed to be extended in a length direction so as to latch and fix the latching apparatus 100 to a cage assembly 21 when the latching apparatus 100 is plugged into cage assembly 21. Further, the clip-type latch 300 is assembled through the outer circumference of the module housing 200 so as to release the latching apparatus 100 from being latched by changing horizontal movement based on the length direction to vertical movement when the clip-type latch 300 is pulled in the length direction in order to unplug the latching apparatus 100 from the cage assembly 21.

Figure 10:
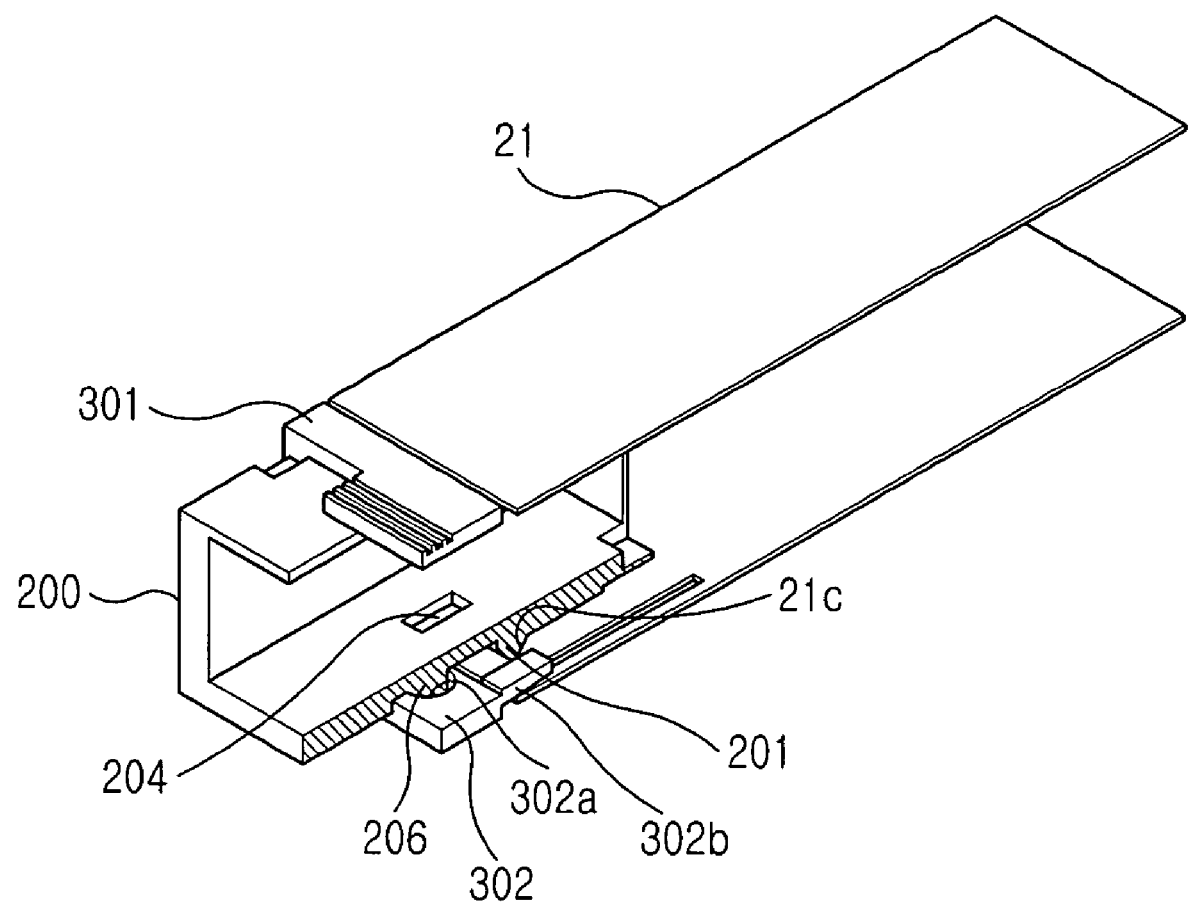
FIG. 10 is a perspective view illustrating a state in which the latching apparatus of the pluggable optical transceiver module according to the preferred embodiment of the present invention is cut offin a length direction.

As shown in FIGS. 8 and 10, a locking arm 201 is formed on the outer circumference of the module housing 200 so as to fix the module housing 200 to the cage assembly 21 by locking the locking arm 201 in a locking catch 21c included in the cage assembly 21 when the module housing 200 is plugged in the cage assembly 21 in a state in which an optical connector 40 (see FIGS. 12 and 16) are connected to the module housing 200.

Figure 16:
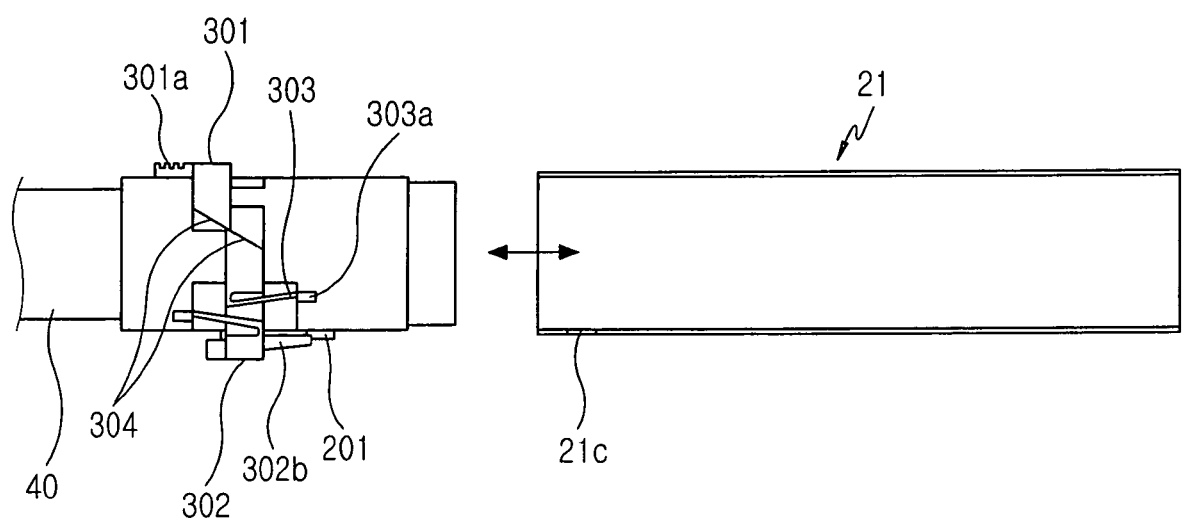
FIG. 16 is a side sectional view illustrating a state in which the module housing is unplugged from a cage assembly while the latching apparatus of the pluggable optical transceiver module according to the preferred embodiment of the present invention is connected to an optical connector.

As shown in FIG. 16, the clip-type latch 300 is structured to be plugged and unplugged in a state in which the optical connector 40 is connected to the module housing 200.

Figure 12:
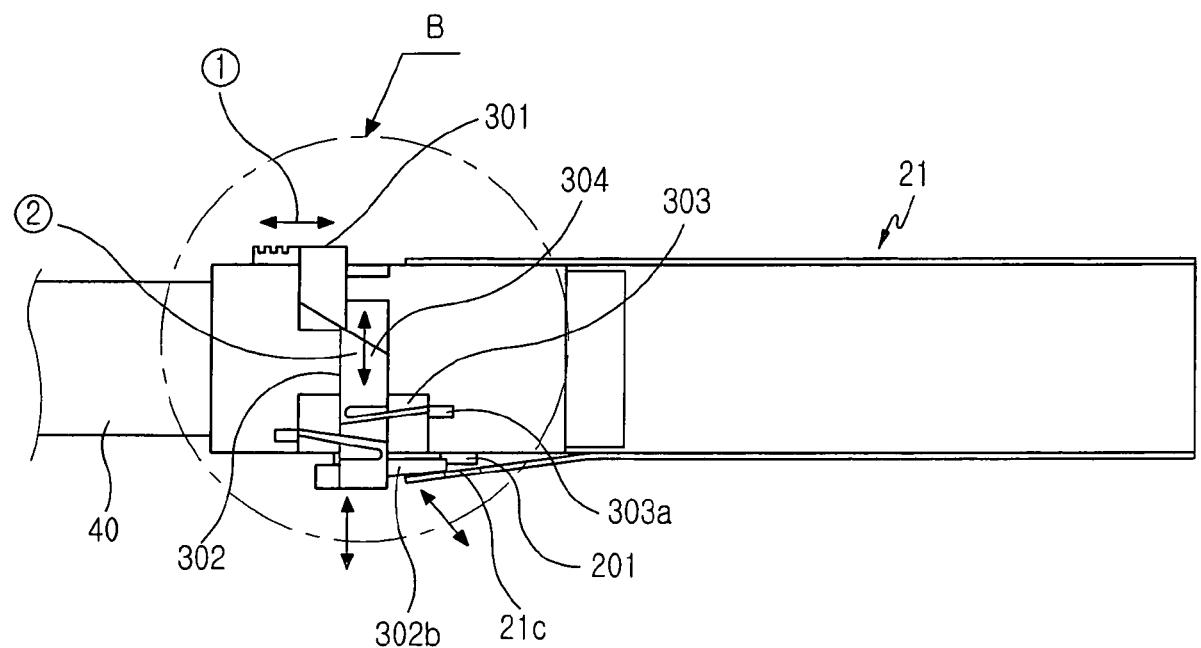
FIG. 12 a side sectional view illustrating a state after operating a clip-type latch of the latching apparatus of the pluggable optical transceiver module according to the preferred embodiment of the present invention.
Figure 13:
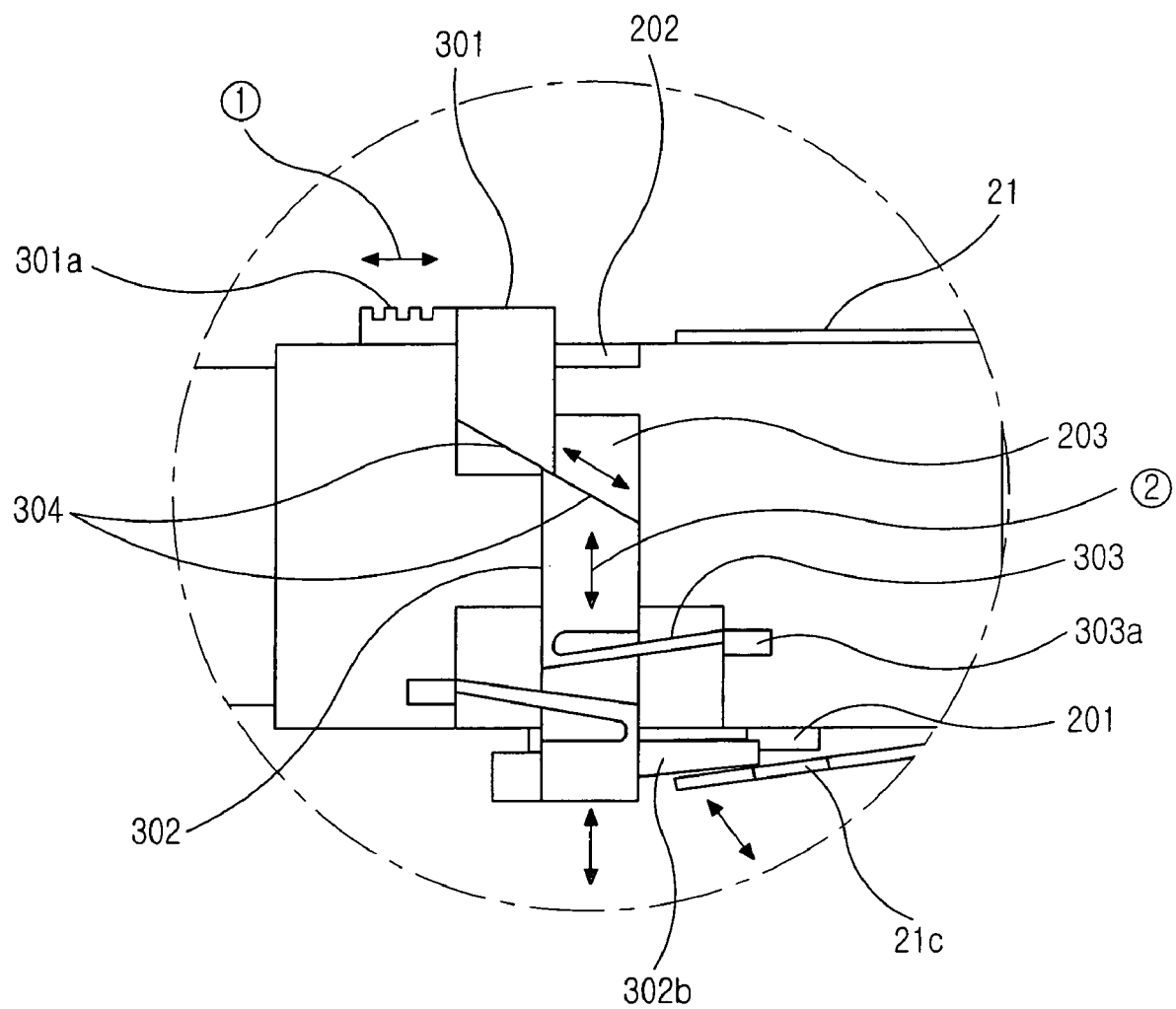
FIG. 13 is a magnified side sectional view of Section B of FIG. 12.

As shown in FIGS. 12 and 13, a pair of first sliding grooves 202 is formed on the outer circumference of the module housing 200 in order to engage the clip-type latch 300 therewith and guide the clip-type latch 300 to reciprocate in a direction horizontal (1) to the length direction, and a pair of second sliding grooves 203 is formed at neighboring locations of the first sliding grooves 202 in order to guide the clip-type latch 300 to reciprocate in a direction vertical (2) to the length direction.

As shown in FIGS. 11 through 15, the clip-type latch 300 includes first and second sliding members 301 and 302, elastic members 303, and guide members 304. The first sliding member 301 is located at both sides of the top of the module housing 200 so as to be slidingly moved to the left and right in the horizontal direction (1) with respect to the length direction when the first sliding member 301 is pulled in the length direction. The second sliding member 302 is located below the first sliding members 301 so as to be slidingly moved in the vertical direction (2) with respect to the length direction in response to slidingly reciprocating of the first sliding members 301 in the horizontal direction (1) with respect to the length direction. The elastic members 303 are located at both sides of the second sliding member 302 so as to install the second sliding member 302 on both sides of the module housing 200 and provide elasticity to the second sliding member 302 in order to slidingly reciprocate the first and second sliding members 301 and 302 in the horizontal and vertical directions (1) and (2) with respect to the length direction. The guide members 304 are formed on the first and second sliding members 301 and 302 in order to guide the second sliding member 302 to be slidingly moved in the vertical direction (2) in response to sliding movement of the first sliding members 301 in the horizontal direction (1) with respect to the length direction when the first sliding member 301 is pulled. A knob 301a is formed in the center of the first sliding member 301.

Figure 14:
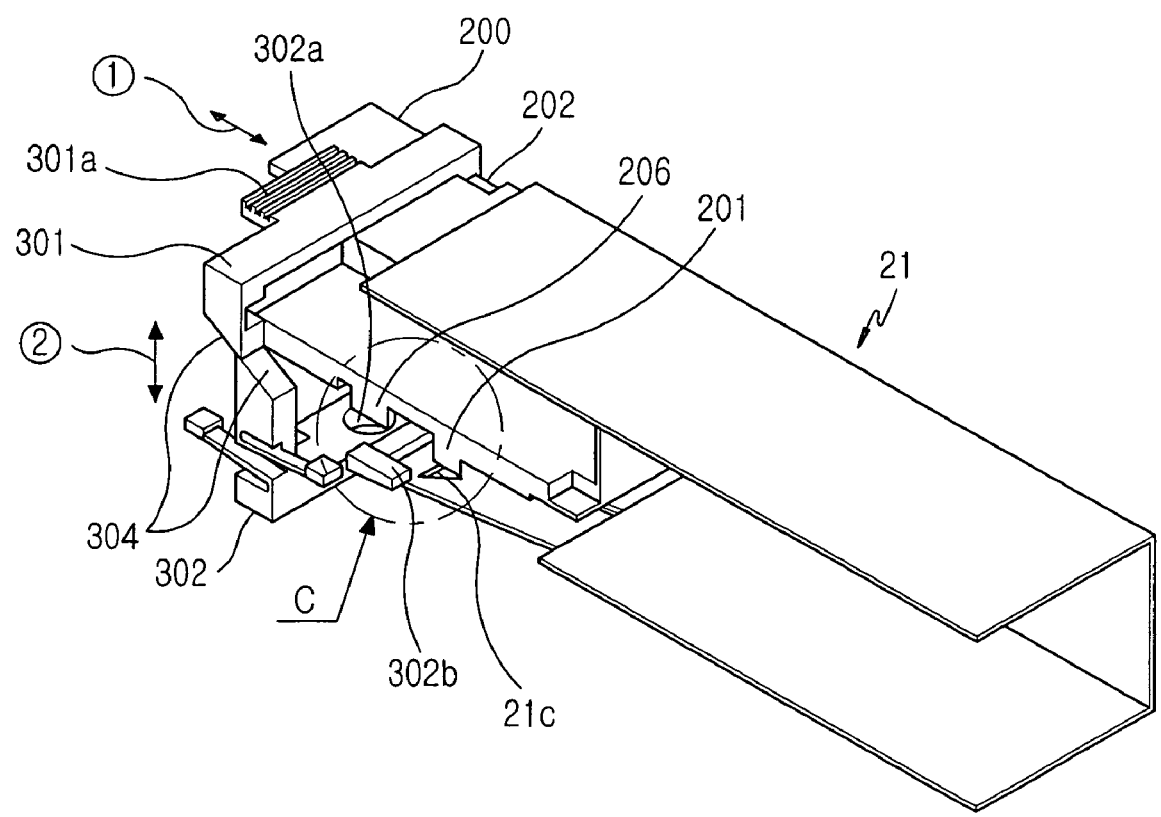
FIG. 14 is a perspective view illustrating an operating process of the clip-type latch of the latching apparatus of the pluggable optical transceiver module according to the preferred embodiment of the present invention.
Figure 15:
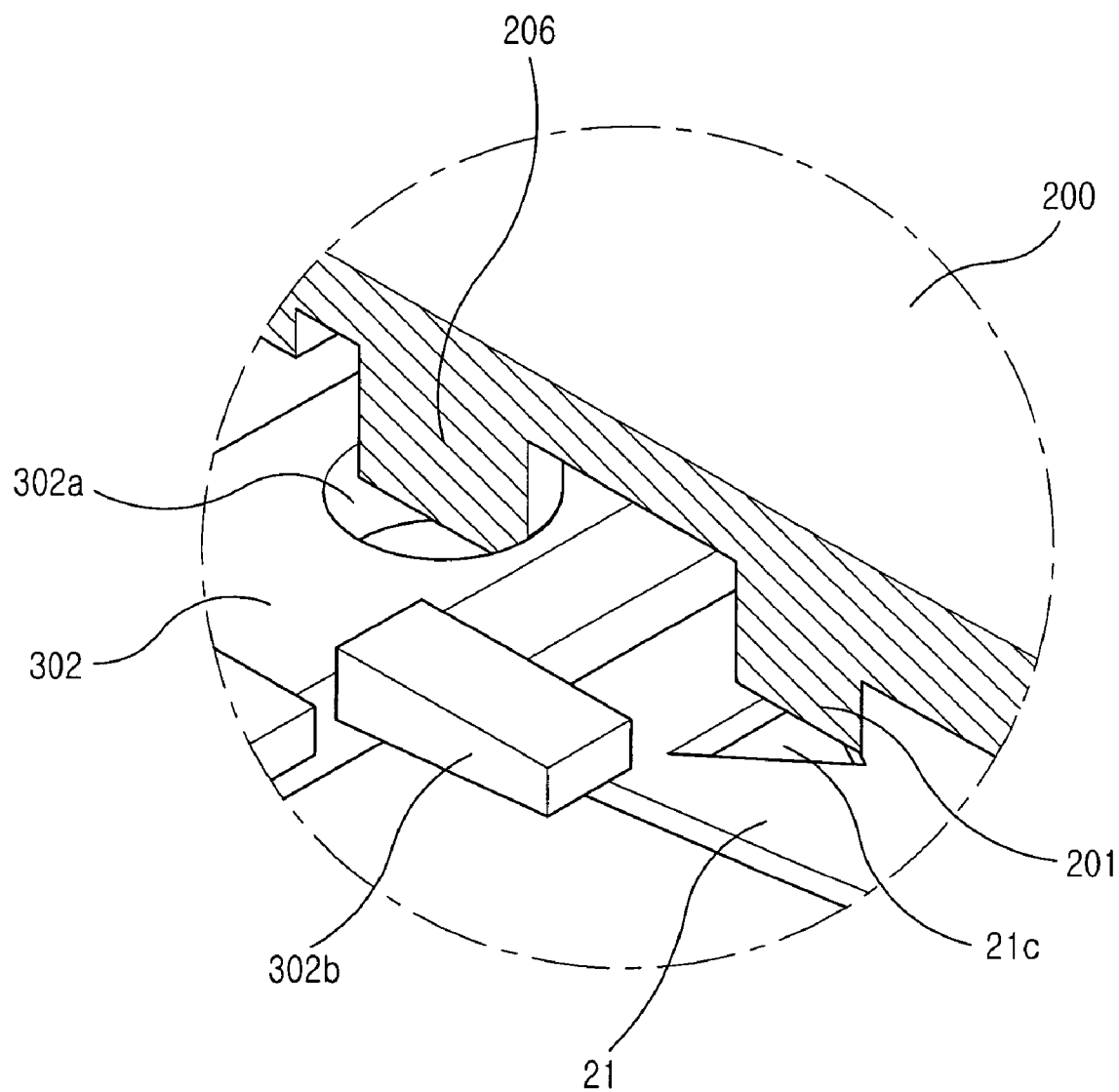
FIG. 15 is a magnified side sectional view of Section C of FIG. 14.

As shown in FIGS. 14 and 15, a guide groove 302a is formed in the center of the second sliding member 302 so as to be engaged with a supporting projection 206 formed on the module housing 200 and guide and support sliding movement of the second sliding member 302. At least one moving locker 302b is formed at an adjacent location of the guide groove 302a in order to unlock the locking arm 201 from the locking catch 21c formed in the cage assembly 21 by a curve generated by pushing the locking catch 21c by moving along with up/down sliding movement of the second sliding member 302 in the vertical direction (2) with respect to the length direction of the second sliding member 302.

As shown in FIG. 8, at least one guide hole 204 to guide the moving locker 302b to be moved is formed on the bottom of the module housing 200.

As shown in FIGS. 12 and 13, each elastic member 303 is comprised of at least one pin spring 303, one end of which is formed with the clip-type latch 300 as one body, and the other end of which is formed to be engaged with and fixed to the module housing 200. A fixing projection 303a to be inserted into and fixed to a fixing groove 205 formed in both sides of the module housing 200 is formed on the other end of the pin spring 303. As shown in FIG. 13, the pin springs 303 are assembled substantially symmetrically to the left and right on the clip-type latch 300.

Each guide member 304 is comprised of an inclined guide surface 304 to vertically reciprocate the second sliding member 302 in response to horizontal reciprocation of the first sliding member 301 with regard to the length direction.

The clip-type latch 300 has a rectangular shape, preferably.

An operating process of the latching apparatus 100 of the pluggable optical transceiver module configured as described above will now be described in more detail with reference to FIGS. 7 through 16.

As shown in FIGS. 7 through 9, the clip-type latch 300 is assembled through the outer circumference of the module housing 200 so as to release the latching apparatus 100 from being latched to the cage assembly 21 by changing horizontal movement with respect to the length direction of the module housing 200 to vertical movement when the clip-type latch 300 is pulled in the length direction of the module housing 200.

As shown in FIG. 7, the clip-type latch 300 includes the first and second sliding members 301 and 302.

The first sliding member 301 is assembled into first sliding grooves 202 formed on the top of the module housing 200.

The second sliding member 302 is assembled into second sliding grooves 203 formed below the first sliding grooves 202.

The second sliding member 302 is fixed to the module housing 200 by inserting the fixing projections 303a formed on the pin springs 303 formed on both sides of the second sliding member 302 into the fixing grooves 205 formed on both sides of the module housing 200.

As shown in FIG. 8, since the guide groove 302a to be engaged with the supporting projection 206 formed on the module housing 200 and guide and support sliding movement of the second sliding member 302 is formed in the center of the second sliding member 302, the supporting projection 206 is engaged with the guide groove 302a.

Figure 11:
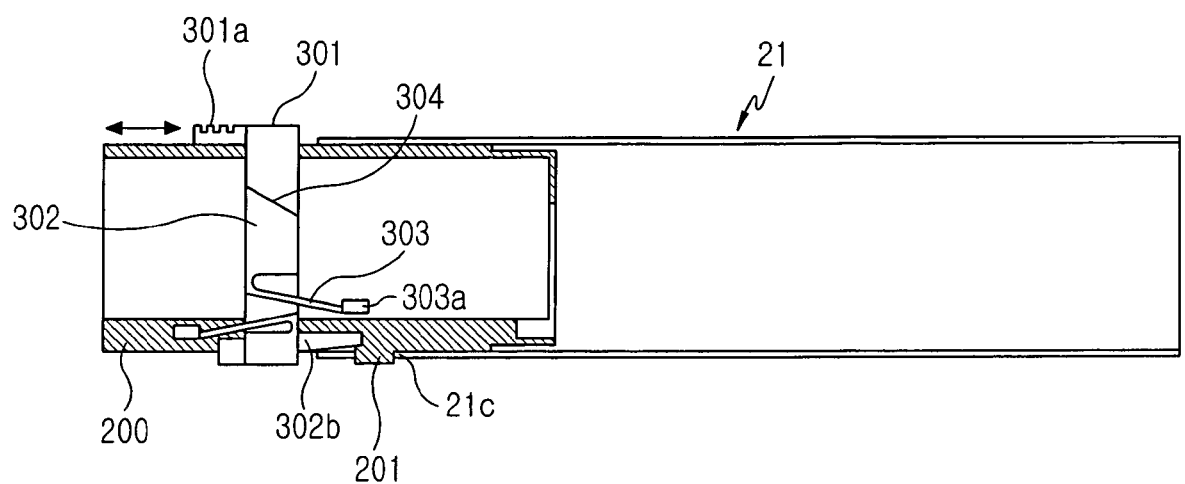
FIG. 11 is a side sectional view illustrating a state before operating a clip-type latch of the latching apparatus of the pluggable optical transceiver module according to the preferred embodiment of the present invention.

As shown in FIG. 11, the optical connector 40 is connected to the module housing 200, and the module housing 200 is plugged in the cage assembly 21.

The module housing 200 is fixed to the cage assembly 21 by the locking arm 201, which is formed on the module housing 200, being inserted into and locked in the locking catch 21c included in the cage assembly 21.

As shown in FIGS. 12 and 13, when the module housing 200 is unplugged from the cage assembly 21, the first sliding member 301 is horizontally moved from the right to the left by holding the knob 301a formed on the first sliding member 301 and pulling the knob 301a in a direction horizontal (1) with respect to the length direction.

Accordingly, the second sliding member 302 is vertically moved from the up to the down in the vertical direction (2) with respect to the length direction along the inclined guide surface 304 formed on the first and second sliding member 301 and 302.

As shown in FIGS. 14 and 15, the moving locker 302b formed on the second sliding member 302 is also moved and contacted with the locking catch 21c and generates a curve by pushing the locking catch 21c to the outside of the module housing 200.

As shown in FIG. 16, the locking arm 201 is unlocked from the locking catch 21c, and the module housing 200 is unplugged from the cage assembly 21 in a state in which the module housing 200 is connected to the optical connector 40.

When the knob 301a formed on the first sliding member 301 is released, the second sliding member 302 is vertically moved from the down to the up by elasticity of the pin spring 303 assembled with the second sliding member 302. Accordingly, the first sliding member 301 returns to its original place by horizontally moving from the left to the right along the inclined guide surface.

As described above, in the inventive pluggable optical transceiver module, by using a clip-type latching apparatus moving horizontally and vertically, the pluggable optical transceiver module can be easily plugged or unplugged in a state in which an optical connector 40 is connected to the pluggable optical transceiver module.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A latching apparatus of a pluggable optical transceiver module connected to an optical connector and electrically connected to a cage assembly, the latching apparatus comprising:
    a module housing, which is extended in a length direction and used to latch and fix the pluggable optical transceiver module to the cage assembly, having a locking arm formed on its base, said module housing having an outer circumference;
    the cage assembly having a locking catch disposed on its base for latching and fixing the module housing and cage assembly together; and
    a clip-type latch used to release the module housing from the cage assembly by moving in response to pulling a knob, disposed on top of the clip-type latch when the module housing is unplugged from the cage assembly, said latch having a plurality of parts that are assembled such that said latch passes, upon assembly of said parts, through said circumference and such that said latch and the module housing are collectively attachable to the cage assembly and subject to said release, a part of said plurality sliding in a direction of said pulling responsively to said pulling.

2. The latching apparatus of claim 1, further comprising:
    a locking arm which is formed on the outer circumference of the module housing so as to fix the module housing to the cage assembly by locking the locking arm in a locking catch included in the cage assembly when the module housing is plugged in the cage assembly in a state in which an optical connector is connected to the module housing.

3. The latching apparatus of claim 1, wherein the clip-type latch is used to plug, and unplug, the module housing, in and from, the cage assembly in a state in which an optical connector is connected to the module housing.

4. A latching apparatus of a pluggable optical transceiver module connected to an optical connector and electrically connected to a cage assembly, the latching apparatus comprising:
a module housing, which is extended in a length direction and used to latch and fix the pluggable optical transceiver module to the cage assembly; and
a clip-type latch, which is assembled through the outer circumference of the module housing and used to release the module housing from the cage assembly by horizontally/vertically moving with respect to the length direction in response to pulling of the clip-type latch when the module housing is unplugged from the cage assembly, wherein the clip-type latch composes:
a first sliding member, which is assembled with both sides of the top of the module housing and slidingly reciprocated to the left and right in a horizontal direction with respect to the length direction in response to pulling of the clip-type latch;
a second sliding member, which is assembled below the first sliding member and slidingly reciprocated in a vertical direction with respect to the length direction in response to reciprocation of the first sliding member in the horizontal direction with respect to the length direction;
elastic members, which are located at both sides of the second sliding member so as to install the second sliding member on both sides of the module housing and provide elasticity to the second sliding member in order to slidingly reciprocate the first and second sliding members in the horizontal and vertical direction with respect to the length direction; and
guide members, which are formed on the first and second sliding members in order to guide the second sliding member to be slidingly reciprocated in the vertical direction in response to sliding reciprocation of the first sliding members in the horizontal direction with respect to the length direction when the first sliding member is pulled.

5. The latching apparatus of claim 4, further comprising:
a pair of first sliding grooves which is formed on the outer circumference of the module housing in order to engage the first sliding member therewith and guide the first sliding member to reciprocate in the horizontal direction with respect to the length direction, and
a pair of second sliding grooves which is formed at neighboring locations of the first sliding grooves in order to engage the second sliding member therewith and guide the second sliding member to reciprocate in the vertical direction with respect to the length direction.

6. The latching apparatus of claim 4, further comprising a knob that is formed in the center of the first sliding member in order to easily pull the first sliding member.

7. The latching apparatus of claim 4, further comprising:
a guide groove which is formed in the center of the second sliding member so as to be engaged with a supporting projection formed on the module housing and guide and support sliding reciprocation of the second sliding member, and
at least one moving locker which is formed at an adjacent location of the guide groove in order to unlock the locking arm from the locking catch formed in the cage assembly by a curve generated by pushing the locking catch by moving along with up/down sliding movement of the second sliding member.

8. The latching apparatus of claim 4, wherein each of the elastic members comprises:
at least one pin spring, one end of which is formed with the clip-type latch as one body, and the other end of which is formed to be fixed to the module housing, and
a fixing projection formed on the other end of the pin spring, the fixing projection being inserted into and fixed to a fixing groove formed in both sides of the module housing.

9. The latching apparatus of claim 8, wherein the pin springs are assembled substantially symmetrically to the left and right on the clip-type latch.

10. The latching apparatus of claim 4, wherein each of the guide members is comprised of an inclined guide surface.

11. The latching apparatus of claim 7, wherein at least one guide hole to guide the moving locker to be moved is formed on the bottom of the module housing.

12. The latching apparatus of claim 1, wherein the clip-type latch has a rectangular shape.

13. The latching apparatus of claim 7, wherein when the module housing is plugged in the cage assembly in a state in which the optical connector is connected to the module housing, if the module housing is inserted into the cage assembly, the locking arm formed on the module housing is latched and locked in the locking catch of the cage assembly;
wherein when the module housing is unplugged from the cage assembly, the first sliding member is slidingly moved in the horizontal direction with respect to the length direction by pulling the first sliding member in the length direction, the second sliding member is slidingly moved in the vertical direction with respect to the length direction along the inclined guide surface, the moving locker is also moved and generates a curve by pushing the locking catch to the outside of the module housing, and the locking arm is unlocked from the locking catch.

14. The latching apparatus of claim 1, said module housing being rectangular in shape as viewed from three mutually orthogonal directions.

15. The latching apparatus of claim 1, wherein fewer than all of the plural parts are caused to slide in said direction of said pulling as a result of said pulling.

16. The latching apparatus of claim 15, said module housing being rectangular in shape as viewed from three mutually orthogonal directions.

17. The latching apparatus of claim 1, configured such that said pulling causes sliding horizontally and vertically.

18. The latching apparatus of claim 1, wherein the assembled latch is disposed perpendicular to said length direction.

19. A latching apparatus of a pluggable optical transceiver module connected to an optical connector and electrically connected to a cage assembly, the latching apparatus comprising:
a module housing, which is extended in a length direction and used to latch and fix the pluggable optical transceiver module to the cage assembly, having a locking arm formed on its base;
the cage assembly having a locking arm catch disposed on its base for latching and fixing the module housing and the cage assembly together; and a clip-type latch having a plurality of parts that are assembled through an outer circumference of the module housing, said latch being used to release the module housing from the cage assembly by reciprocal sliding of the parts in perpendicular directions in response to pulling a knob, disposed on top of the clip-type latch when the module housing is unplugged from the cage assembly and thereby separating said latch from the cage assembly, a part of said plurality sliding in a direction of said pulling responsively to said pulling.

20. The latching apparatus of claim 19, wherein the assembled latch is disposed perpendicular to said length direction.

* * * * *